United States Patent Office 3,436,387
Patented Apr. 1, 1969

3,436,387
POLYVALENT ALKYLENEIMINE ESTERS
AND PROCESS THEREFOR
Joseph Adrian Hoffman, Bridgewater Township, Somerset, N.J., assignor to American Cyanamid Company, Stamford, Conn., a corporation of Maine
No Drawing. Continuation-in-part of application Ser. No. 345,849, Feb. 19, 1964. This application Feb. 5, 1965, Ser. No. 430,758
Int. Cl. C07d 23/06; C08c 11/52
U.S. Cl. 260—239                                    4 Claims

ABSTRACT OF THE DISCLOSURE

This invention relates to 2,2',2''-nitrilotrialkyl triesters of 1-aziridinepropionic acids, the esters having the formula:

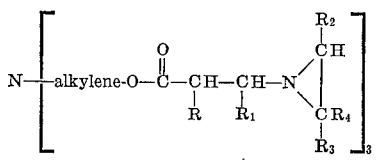

wherein "alkylene" has 2–6 carbon atoms; R and $R_1$ are hydrogen, lower alkyl or phenyl; $R_2$ is alkyl and $R_3$ and $R_4$ are hydrogen or lower alkyl. The esters are useful as cross-linking agents, particularly for elastomers.

---

This application is a continuation-in-part of application Ser. No. 345,849, filed Feb. 19, 1964, now abandoned.

This invention relates to a new class of compounds. More particularly, it relates to 2,2',2''-nitrilotrialkyl triesters of 1-aziridinepropionic acids, the esters having the formula:

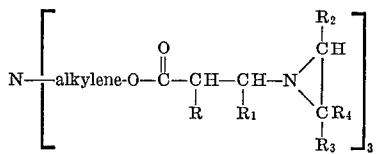

wherein "alkylene" has 2–6 carbons; R and $R_1$ are hydrogen, lower alkyl or phenyl; and $R_2$, $R_3$ and $R_4$ are hydrogen or lower alkyl. It also relates to the use of the esters of Formula I as crosslinking agents, particularly for elastomers.

The compounds of this invention are prepared by reacting a 2,2'2''-nitrilotrialkyl triester of an alpha, beta-unsaturated acid of Formula II with an ethylenimine (or aziridine) of Formula III as follows:

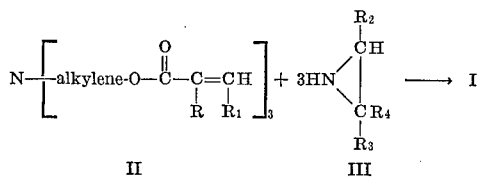

wherein R, $R_1$, $R_2$, $R_3$, $R_4$ and "alkylene" are as defined above.

The 2,2',2''-nitrilotrialkyl triesters of alpha, beta-unsaturated acids (Formula II) may be prepared by reacting the corresponding nitrilotri(lower alkanol) with the acid chloride of the alpha, beta-unsaturated acid in an inert solvent such as chloroform, as described in Compt. Rend. 234, 2294 (1952) for acrylic, methacrylic and crotonic acids.

Examples of the nitrilotri(lower alcohols) which can be used in making the 2,2',2''-nitrilotrialkyl triesters of alpha, beta-unsaturated acids (Formula II) include 2,2',2'' - nitrilotriethanol, 3,3',3''-nitrilotri - 1-propanol, 1,1',1''-nitrilotri-2-propanol, 4,4',4''-nitrilotri - 1-butanol, 3,3',3''-nitrilotri-2-butanol, 5,5',5''-nitrilotri - 1-pentanol, etc.

Acid chlorides of use in this invention are those of alpha, beta-unsaturated acids such as lower alkenoic acids [e.g., acrylic acid, methacrylic acid, crotonic acid and alpha, beta-dimethylacrylic acid (tiglic acid)] and monocyclic aryl lower alkenoic acids (e.g., cinnamic acid). These acids may bear substituents which are inert to the condensation reaction, such as nitro and alkoxy groups.

Ethylenimines which can be reacted with compounds of Formula II include ethylenimine, 1,2-propylenimine (2-methylaziridine), 1,2-butylenimine (2-ethylaziridine), 2,3-butylenimine (2,3-dimethylaziridine), 2-methyl-1,2-propylenimine (2,2-dimethylaziridine), etc.

The reaction between the 2,2',2''-nitrilotri(lower alkyl) triester of the alpha, beta-unsaturated acid and the ethylenimine compound is carried out by contacting the ester with an excess of the imine. Generally, it is neither necessary nor desirable to use a solvent. The reactants are stirred at moderate temperatures (e.g., 50°–90° C.) until the desired reaction is essentially complete. The reaction may be hastened by use of a basic catalyst, such as a sodium or potassium alkoxide, sodium or potassium amide, the sodium or potassium salt of a lower alkanoic acid, penta-lower alkylguanidine, tri-lower alkylamine, etc.

It is usually advantageous to use an excess of the ethylenimine compound. The excess of ethylenimine compound can be recovered by distillation.

Compounds of Formula I are usually mobile, nonviscous liquids. After removal of any excess imine and catalyst, the products are of satisfactory purity for normal use.

The products of this invention contain three aziridinyl groups and are reactive with monomeric and polymeric compounds having reactive hydrogens, including alcohols, phenols, mercaptans, thiophenols, carboxylic acids, amines, etc. They are thus useful as crosslinking agents in the preparation of plastics and resins, textiles, varnishes, paper, etc. For example, they are effective curing agents for vulcanizable rubbery materials which serve as binders in solid rocket propellent compositions. Rubbery materials include homopolymers of conjugated dienes and copolymers of conjugated dienes with materials copolymerizable therewith (as shown in U.S. Patent No. 3,087,843). Of particular interest is their use in propellent compositions comprising an inorganic oxidizing salt and either a synthetic acid-terminated polymeric binder or a synthetic copolymer of a conjugated diene and an unsaturated carboxylic acid (see U.S. Patent 3,087,844). The first type of polymer may be exemplified by the formula:

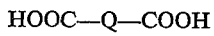

HOOC—Q—COOH wherein Q is a polymer chain, as for example, a polymer of a conjugated diene such as 1,3-butadiene. The second type of polymer may be exemplified by a copolymer of 1,3-butadiene and acrylic acid. Utility in this capacity is surprising since many known polyalkylene imine compounds are unstable and undergo polymerization on standing, whereas the present compounds are stable at room temperature for long periods.

The following examples, in which parts and percentages are by weight, are presented to further illustrate this invention.

EXAMPLE 1

2,2′,2″-nitrilotriethyl tris(2-methyl-1-aziridine-propionate)

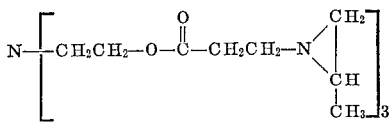

To a mixture of 6.0 parts (0.1 mole) of 1,2-propylenimine and 1.0 part of triethylamine, there is slowly added a mixture of 9.33 parts (0.01 mole) of 2,2′,2″-nitrilotriethyl triacrylate and 2.0 parts of triethylamine. The reaction mixture is stirred at reflux under a head of nitrogen for about one day. After removal of triethylamine and excess 1,2-propylenimine by distillation, the product remains as a clear yellow, mobile oil.

The corresponding 3,3′,3″-nitrilotri-n-propyl and 2,2′,2″-nitrilotri(1,2-dimethylethyl) compounds are obtained when the 2,2′,2″-nitrilotriethyl triacrylate is replaced by 3,3′,3″-nitrilotri-n-propyl triacrylate or 2,2′,2″-nitrilotris(1,2-dimethylethyl)triacrylate, respectively.

EXAMPLE 2

2,2′,2″-nitrilotriethyl tris(beta-2-dimethyl-1-aziridinepropionate)

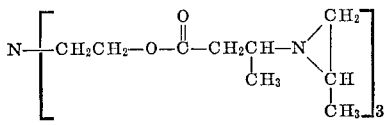

To 5.0 parts of 1,2-propylenimine there is added 5.0 parts of 2,2′,2″-nitrilotriethyl tricrotonate. After stirring overnight, under gentle reflux, the excess of propylenimine is removed by distillation. The product remains as a clear yellow oil.

The corresponding 3,3′,3″-nitrilotri-n-propyl and 2,2′,2″-nitrilotri(1,2-dimethylethyl) compounds are obtained when the 2,2′,2″-nitrilotriethyl triacrylate is replaced by 3,3′,3″-nitrilotri-n-propyl triacrylate or 2,2′,2″-nitrilotris(1,2-dimethylethyl) triacrylate, respectively.

EXAMPLE 3

2,2′,2″-nitrilotriethyl tris(2-methyl-beta-phenyl-1-aziridinepropionate)

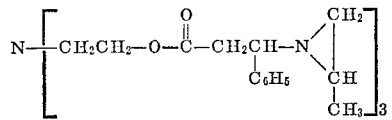

To a mixture of 10.0 parts of 1,2-propylenimine and a trace amount of pentamethylguanidine, there is added 6.0 parts of 2,2′,2″-nitrilotriethyl tricinnamate. The reaction mixture is stirred at ambient temperature for about two days. After removal of the excess propylenimine, the product is obtained as an amber colored oil.

The corresponding 3,3′,3″-nitrilotri-n-propyl and 2,2′,2″-nitrilotri(1,2-dimethylethyl) compounds are obtained when the 2,2′,2″-nitrilotriethyl triacrylate is replaced by 3,3′,3″-nitrilotri-n-propyl triacrylate or 2,2′,2″-nitrilotris(1,2-dimethylethyl) triacrylate, respectively.

EXAMPLE 4

2,2′,2″-nitrilotriethyl tris(beta-phenyl-1-aziridinepropionate)

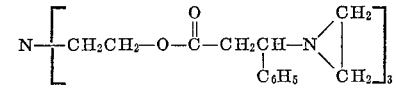

A mixture of 3.0 parts of 2,2′,2″-nitrilotriethyl tricinnamate and 10 parts of ethylenimine is stirred at ambient temperature for about 24 hours. After the excess of ethylenimine is removed by distillation, the product is obtained as an oil.

The corresponding 3,3′,3″-nitrilotri-n-propyl and 2,2′,2″-nitrilotri(1,2-dimethylethyl) compounds are obtained when the 2,2′,2″-nitrilotriethyl triacrylate is replaced by 3,3′,3″-nitrilotri-n-propyl triacrylate or 2,2′,2″-nitrilotris(1,2-dimethylethyl) triacrylate, respectively.

EXAMPLE 5

The procedure of Example 1 is followed substituting an equivalent amount of 2,2′,2″-nitrilotriethyl trimethacrylate for the 2,2′,2″-nitrilotriethyl triacrylate.

The corresponding 3,3′,3″-nitrilotri-n-propyl and 2,2′,2″-nitrilotri(1,2-dimethylethyl) compounds are obtained when the 2,2′,2″-nitrilotriethyl triacrylate is replaced by 3,3′,3″-nitrilotri-n-propyl triacrylate or 2,2′,2″-nitrilotris(1,2-dimethylethyl) triacrylate, respectively.

EXAMPLE 6

The procedure of Example 1 is followed substituting an equivalent amount of 2,2′,2″-nitrilotriethyl tris(alpha, beta-dimethylacrylate) for the 2,2′,2″-nitrilotriethyl triacrylate.

The corresponding 3,3′,3″-nitrilotri-n-propyl and 2,2′,2″-nitrilotri(1,2-dimethylethyl) compounds are obtained when the 2,2′,2″-nitrilotriethyl triacrylate is replaced by 3,3′,3″-nitrilotri-n-propyl triacrylate or 2,2′,2″-nitrilotris(1,2-dimethylethyl) triacrylate, respectively.

EXAMPLE 7

The procedure of Example 1 is followed substituting an equivalent amount of 1,2-butylenimine for the 1,2-propylenimine.

The corresponding 3,3′,3″-nitrilotri-n-propyl and 2,2′,2″-nitrilotri(1,2-dimethylethyl) compounds are obtained when the 2,2′,2″-nitrilotriethyl triacrylate is replaced by 3,3′,3″-nitrilotri-n-propyl triacrylate or 2,2′,2″-nitrilotris(1,2-dimethylethyl) triacrylate, respectively.

EXAMPLE 8

The procedure of Example 1 is followed substituting an equivalent amount of 2,3-butylenimine for the 1,2-propylenimine.

The corresponding 3,3′,3″-nitrilotri-n-propyl and 2,2′,2″-nitrilotri(1,2-dimethylethyl) compounds are obtained when the 2,2′,2″-nitrilotriethyl triacrylate is replaced by 3,3′,3″-nitrilotri-n-propyl triacrylate or 2,2′,2″-nitrilotris(1,2-dimethylethyl) triacrylate, respectively.

EXAMPLE 9

2,2′,2″-nitrilotriethyl tris(1-aziridinepropionate)

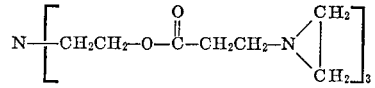

A mixture of equal parts of ethylenimine and 2,2′,2″-nitrilotriethyl triacrylate is stirred under a head of nitrogen for 12 hours, followed by a reflux period of 12 hours. After removal of excess ethylenimine by vacuum distillation, the product is obtained as a pale yellow oil.

The corresponding 3,3′,3″-nitrilotri-n-propyl and 2,2′,2″-nitrilotri(1,2-dimethylethyl) compounds are obtained when the 2,2′,2″-nitrilotriethyl triacrylate is replaced by 3,3′,3″-nitrilotri-n-propyl triacrylate or 2,2′,2″-nitrilotris(1,2-dimethylethyl) triacrylate, respectively.

EXAMPLE 10

A mixture of 20.0 parts of a carboxy-terminated polybutadiene (molecular weight about 3800) and 2.0 parts of 2,2′,2″-nitrilotriethyl tris(beta, 2-dimethyl-1-aziridinenate) is heated in an oven at 55° C. for about 24 hours. An elastomeric polymer is obtained.

The corresponding 3,3′,3″-nitrilotri-n-propyl and 2,2′,2″-nitrilotri(1,2-dimethylethyl) compounds are obtained when the 2,2′,2″-nitrilotriethyl triacrylate is replaced by 3,3′,3″-nitrilotri-n-propyl triacrylate or 2,2′,2″-nitrilotris(1,2-dimethylethyl) triacrylate, respectively.

EXAMPLE 11

A mixture of 20.0 parts of a carboxy-terminated polybutadiene (molecular weight about 3800) and 1.8 parts of 2,2′,2″-nitrilotriethyl tris(beta,2-dimethyl-1-aziridinepropionate) is heated in an oven at 55° C. for about 24 hours. A rubbery polymer is obtained.

The corresponding 3,3′,3″-nitrilotri-n-propyl and 2,2′,2″-nitrilotri(1,2-dimethylethyl) compounds are obtained when the 2,2′,2″-nitrilotriethyl triacrylate is replaced by 3,3′,3″-nitrilotri-n-propyl triacrylate or 2,2′,2″-nitrilotris(1,2-dimethylethyl) triacrylate, respectively.

EXAMPLE 12

A mixture of 20.0 parts of a carboxy-terminated polybutadiene (molecular weight about 3800) and 1.8 parts of 2,2′,2″-nitrilotriethyl tris(2-methyl-beta-phenyl-1-aziridinepropionate) is heated in an oven at 55–60° C. for one week. A rubbery polymer is obtained.

The corresponding 3,3′,3″-nitrilotri-n-propyl and 2,2′,2″-nitrilotri(1,2-dimethylethyl) compounds are obtained when the 2,2′,2″-nitrilotriethyl triacrylate is replaced by 3,3′,3″-nitrilotri-n-propyl triacrylate or 2,2′,2″-nitrilotris(1,2-dimethylethyl) triacrylate, respectively.

I claim:

1. A compound of the formula:

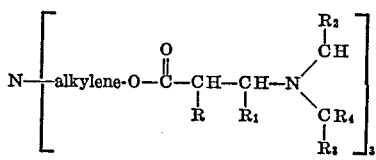

wherein "alkylene" has 2–6 carbons; R and $R_1$ are individually selected from the group consisting of hydrogen, lower alkyl and phenyl; $R_2$ is lower alkyl and $R_3$ and $R_4$ are individually selected from the group consisting of hydrogen and lower alkyl.

2. The compound:

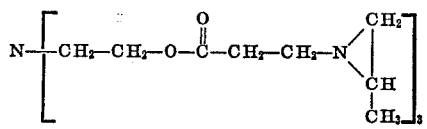

3. The compound:

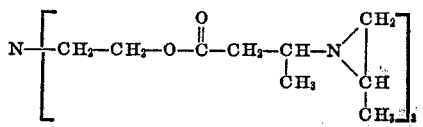

4. The compound:

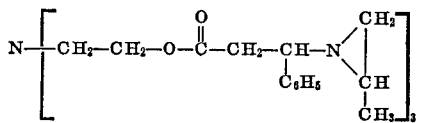

References Cited

UNITED STATES PATENTS 2,596,200   5/1952   Bestian.

FOREIGN PATENTS 639,848   4/1962   Canada.

ALTON D. ROLLINS, *Primary Examiner.*

U.S. Cl. X.R.

260—476, 482, 584, 544, 79.5, 86.7, 94.7; 149—19